United States Patent [19]
Popeil

[11] 3,955,278
[45] May 11, 1976

[54] CUTTING BOARD AND KNIFE SET

[75] Inventor: Samuel J. Popeil, Chicago, Ill.

[73] Assignee: Popeil Brothers, Inc., Chicago, Ill.

[22] Filed: Jan. 10, 1975

[21] Appl. No.: 540,239

[52] U.S. Cl. .................................. 30/124; 30/296 R
[51] Int. Cl.² .......................................... B26B 11/00
[58] Field of Search ........................... 30/124, 296 R

[56] References Cited
UNITED STATES PATENTS 3,335,473    8/1967    Gentoso ................................ 30/124

*Primary Examiner*—Al Lawrence Smith
*Assistant Examiner*—J. T. Zatarga
*Attorney, Agent, or Firm*—Dominik, Knechtel, Godula & Demeur

[57] ABSTRACT

A cutting board and knife set is disclosed in which the cutting board has a handle which is recessed to receive the handle of a knife having a complementary configuration to the recess. The recess in the cutting board handle is characterized by a pair of opposed locking tongues which fit into opposed locking recesses or tongue slots in the knife handle. A keyhole is provided also in the cutting board handle for hanging the same on the wall while the knife is lodged in its nesting configuration. At the end of the cutting board opposite the handle, a bevel type scoop is provided in order to pick up pieces of food stuffs that may have fallen off of the cutting board onto a working surface. The material for the cutting board is a high density polypropylene which resists scarring, and is in injection moldable, thereby providing a cutting surface which is pebbled for long life, easing cleaning in a dish washer, and good sanitation.

9 Claims, 6 Drawing Figures

U.S. Patent May 11, 1976 3,955,278
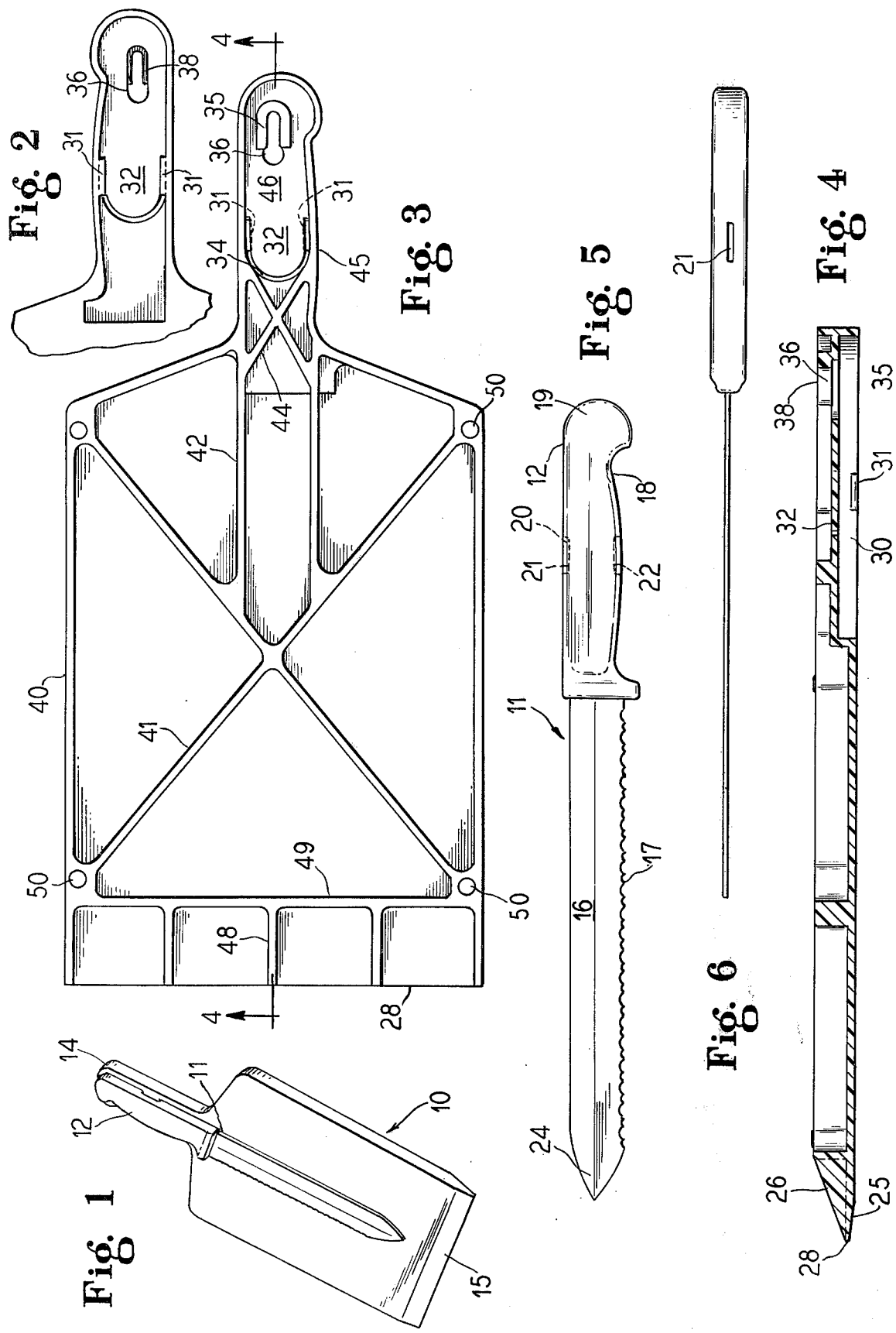

CUTTING BOARD AND KNIFE SET

FIELD OF INVENTION

The present invention relates generally to cutting boards, but more particularly to a cutting board which removably receives and holds a cutting knife.

SUMMARY OF THE PRIOR ART

Kitchen knives obviously have been used for years. Wooden cutting boards are old in the art. Some cutting boards have been made out of flat pieces of plastic. Invariably the knife and cutting board are never together when the homemaker wishes to use the two together. In addition, cutting boards made of wood are not readily cleansed in the dishwasher. Many of the cutting boards molded out of plastic which may have the advantages of light weight and washability are not readily stored, and certainly have little or no provision for securing together in combination with a knife.

SUMMARY

The present invention is directed to a cutting knife and cutting board, the handles of both serving to interlock the same and storable combination. The cutting knife handle has a pair of opposed tongue slots, an upper slot, and a lower slot on a curved handle. The cutting board handle has a recess defined by an interior web from which a release tab is cut, and a hanging key is provided. Also interiorly of the handle of the cutting board are a pair of opposed locking tongues which snap into the tongue slots of the handle when the knife is secured within the cutting board for storage. The release tab is actuated by twisting the handle, a task difficult for a small child, but easy for an adult. In addition, the cutting board is provided with a scoop at its front edge to assist in picking up items which are cut prior to cooking or otherwise using.

In view of the foregoing it is one of the principal objects of the present invention to provide a cutting board and knife set in which the knife may be stored by press fitting its handle into the handle of the cutting board.

Another object of the present invention is to provide a cutting board and knife set in which the means for securing the knife handle within the cutting board handle provides for a release by an adult hand, but discourage release by the hand of a small child.

Still another object of the present invention is to provide a cutting board and knife set which have the provision at the handle of the cutting board for hanging the same on the wall for storage.

Still another object of the present invention is to provide a cutting board and knife set in which the cutting board is light weight, easy to manipulate, and includes stops on the undersurface to secure the same against dislodgement on the typical wet formica kitchen counter.

Still another object of the present invention is to provide a cutting board and knife set in which a scoop is provided at the forward portion of the cutting board, and yet the underneath portion is recessed and reinforced thereby rendering the same light in weight, and yet resistant to bending.

DESCRIPTION OF ILLUSTRATIVE DRAWINGS

Further objects and advantages of the present invention will become apparent as the following description proceeds, taken in conjunction with the accompanying drawings in which:

FIG. 1 is a perspective view of the cutting board and knife set showing the knife in its nesting engagement with the cutting board.

FIG. 2 is a top view of the cutting board emphasizing the handle portion of the cutting board.

FIG. 3 is a bottom view of the cutting board and handle showing the reinforcing construction as well as the handle details.

FIG. 4 is a transverse sectional view of FIG. 3 taken along section lines 4—4 FIG. 3.

FIG. 5 is a front elevation of the knife.

FIG. 6 is a top view of the knife taken in the same scale as shown in FIG. 5.

DESCRIPTION OF PREFERRED EMBODIMENT

The subject cutting board 10 and knife 11 are shown in their assembled configuration in FIG. 1. There it will be seen that the knife handle 12 is nested in the cutting board handle 14, the knife blade 16 being positioned atop the cutting surface 13 of the cutting board 10. The forward portion of the cutting board 10 has a scoop portion 15 which will be described in greater detail hereinafter.

Turning now to FIGS. 5 and 6, it will be seen that the knife 11 has a serrated edge 17 on the knife blade 16. The forward portion of the knife blade 16 has a sharpened point 24 which assists in initiating a cut. The knife handle 12 has a lower curvilinear finger grip 18 and terminates at its rear portion in a reversely curved end 19. A pair of opposed tongue slots 20 are provided in the knife handle 12, being respectively an upper slot 21 and a lower slot 22. The particular slot configuration of the tongue slot 20 is substantially rectangular in cross section, with a modest radius at the upper and lower edges where they join the exterior portion of the handle 12. The tongue slots 20 coact with a pair of opposed locking tongues 31 in the cutting board handle 14. To be observed in FIG. 2 is the position of the opposed locking tongue 21 at an upper portion of the top of the cutting board handle 14 and at a mid-position along the length of the cutting board handle 14. The central portion of the cutting board handle 14 is provided with a handle web 46 which joins the handle wall at a mid-position. The handle wall 45 extends substantially around the entirety of the cutting board handle 14. A relief tab slot 34 in the handle web 46 defines a release tab 32 which is positioned beneath the knife handle 12 when the knife handle is nested within the cutting board handle 14. In operation the knife 11 is positioned over the cutting surface 13 of the cutting board 10, and the knife handle 12 positioned to nest within the locking recess 30 at the upper portion of the cutting board handle 14. By firmly pressing the knife handle 12 downwardly, the opposed locking tongues 31 are spread slightly outwardly, and then snap into position within the upper slot 21 and lower slot 22 of the knife handle 12. In order to remove the handle, the same is grasped by the user with one or two fingers beneath the release tab 32. By applying slight pressure to the release tab 32, and twisting the combined construction of the knife handle 12 and the cutting board 14, the knife 11 is removed from its nesting position. The effort required is more than that of a small child, both from a standpoint of a turning effort, as well as the physical dimensions of the two elements together. Thus little hands are discouraged from removing the knife from its otherwise secured position in the cutting board 10.

Turning now to FIG. 3, the lower portion of the cutting board 10 is provided with a reinforcing X brace 41. The X brace 41 terminates close to the four corner portions of the cutting board 10. At the forward portion, the legs of the X brace 41 are joined by the scoop rib web 49 which runs transversely of the cutting board 10. Forwardly from the scoop web 49 are a plurality of scoop ribs 48. The scoop ribs 48 are provided at their lower surface with a lower bevel 26, and an upper bevel 25. As noted particularly in the portion opposite the cutting board handle 14 in FIG. 4, the upper bevel 25 is considerably more acute than the lower bevel 26. The forward portion of the upper bevel 25 terminates in a straight edge 28, which is as thin as possible commensurate with good molding techniques. The balance of the cutting board 10 is reinforced by means of the handle X brace 41 (see FIG. 3) which is substantially central of the intersection between the cutting board handle 14 and the cutting surface 13. Side walls 40 depend from the periphery of the cutting surface 13 and run around the entire cutting surface with the exception of the front edge 28. Finally, it will be noted that a pair of parallel handle ribs extend forwardly to the center of the main X brace 41 from the handle brace portion 44.

When in use, the cutting board 10 is placed on top of a flat surface, so that the knife 11 can be used against food stuffs which are on top of the cutting surface 13. To inhibit slipping of the cutting board 10, provision is made for four stops 50 provided in the lower portion of the cutting board 10 and located at the intersections of the remote edges of the legs of the X brace 41 where the same intersects the side walls 40, at an enlarged slightly radiused area. Appropriate recesses are molded at the intersection, and the stops 50, of a rubber-like material, are press fitted in place so that they extend slightly beyond the lower extermity of the side walls 40.

Further to facilitate the storage of the cutting board and knife set, provision is made in the remote end of the cutting board handle 14 for a hanging key 35. The hanging key 35, as shown particularly in FIGS. 3 and 4, includes a keyhole 36, and a keyhole lug 38. Thus the combined cutting board 10 and knife 11 may be hung on a wall with the knife 11 and the cutting surface 13 positioned outwardly, and the bottom edges of the side walls 40 and the stops 50 snugly against the wall or other vertical surface.

The cutting board is desirably molded from a high molecular weight high density polyethylene. The upper portion of the cutting surface 13 is preferably molded with a pebble-like configuration which prevents slipping and sliding of the knife, and also assists in securing the food stuffs in ready release relationship.

In review it will be seen that a cutting board 10 and knife 11 have been disclosed and described in which the knife handle 12 may be conveniently nested within the cutting board handle 14 for storage. The same is removably secured, with a relatively easy motion for an adult hand but a difficult motion for a smaller child's hand. The assembled combination is further provided with means including a hanging key 35 for supporting the same on a vertical surface. The forward portion of the cutting board 10 is provided with a scoop portion 15 for facilitating the picking up of food stuffs which may fall off the cutting board 10 in a cutting operation. The entire combination is light in weight, easy to manipulate, and the cutting board 10 as well as the knife 11 may be placed in a dishwasher for cleaning, or otherwise rinsed to cleanliness prior to storing. In addition, the stops 50 provided at the lower portion of the side walls 40 of the cutting board reduce the tendency for the cutting board 10 to slide on a wet kitchen surface.

Although particular embodiments of the invention have been shown and described in full here, there is no intention to thereby limit the invention to the details of such embodiments. On the contrary, the intention is to cover all modifications, alternatives, embodiments, usages and equivalents of a cutting board and knife set as fall within the spirit and scope of the invention, specification and the appended claims.

What is claimed is:

1. A cutting board and knife combination comprising, in combination,
a cutting board having an upper cutting surface and a handle extending from one end thereof,
a locking recess within the cutting board handle
a knife having a handle portion with a sectional configuration complementary to the recess in the cutting board handle to nest therein
and snap acting locking means in the cutting board handle and the knife handle for coactingly securing the knife handle within the recess, the knife blade being positioned atop the cutting board surface.

2. In the cutting board and knife set of claim 1,
said cutting board handle having a peripheral handle wall,
a web joining the handle wall portion at a mid-portion of the cutting board handle,
a pair of opposed tongues in an upper portion of the handle side walls and extending inwardly,
and a pair of recesses in the knife handle for snap acting engagement with the opposed members in the handle.

3. In the cutting board and knife combination of claim 1,
a scoop portion at that portion of the cutting board opposed to the cutting board handle,
said scoop portion having an upper bevel surface and a lower bevel surface,
the upper bevel surface having an angle with the cutting board surface more acute than that of the lower angle.

4. In the cutting board and knife combination of claim 1,
a plurality of frictional type stop means positioned on the lower portion of the cutting board.

5. In the cutting board and knife combination of claim 1,
an X brace type cross frame in the lower portion of the cutting board
a peripheral side wall depending from the surface of the cutting board,
said X brace portion having extending legs terminating at at least two corner portions of the side walls.

6. In the cutting board and knife combination of claim 1,
means defining a flexible tab interiorly of the cutting board handle,
said means being positioned substantially beneath the locking means, whereby upon pressing the flexible tab and slightly twisting the handle the nested knife handle may be removably secured from its nested engagement.

7. In the cutting board and knife combination of claim 2, a scoop portion at that portion of the cutting board opposed to the cutting board handle, said scoop portion having an upper bevel surface and a lower bevel surface, the upper bevel surface having an angle with the cutting board surface more acute than that of the lower angle.

8. In the cutting board and knife combination of claim 7, means defining a flexible tab interiorly of the cutting board handle, said means being positioned substantially beneath the locking means, whereby upon pressing the flexible tab and slightly twisting the handle the nested knife handle may be removably secured from its nested engagement.

9. In the cutting board and knife combination of claim 8, an X brace type cross frame in the lower portion of the cutting board a peripheral side wa-l depending from the surface of the cutting board, said X brace portion having extending legs terminating at at least two corner portions of the side walls.

* * * * *